(12) United States Patent
Venkob et al.

(10) Patent No.: US 8,879,515 B2
(45) Date of Patent: *Nov. 4, 2014

(54) SYSTEMS AND METHODS FOR ASSIGNMENT AND ALLOCATION OF MIXED-TYPE COMBINATIONS OF SLOTS

(75) Inventors: Satish Venkob, Waterloo (CA); Noushad Naqvi, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 860 days.

This patent is subject to a terminal disclaimer.

(21) Appl. No.: 12/600,101

(22) PCT Filed: Feb. 13, 2009

(86) PCT No.: PCT/CA2009/000174
§ 371 (c)(1),
(2), (4) Date: Nov. 13, 2009

(87) PCT Pub. No.: WO2009/100533
PCT Pub. Date: Aug. 20, 2009

(65) Prior Publication Data
US 2010/0303045 A1 Dec. 2, 2010

Related U.S. Application Data

(60) Provisional application No. 61/029,181, filed on Feb. 15, 2008.

(51) Int. Cl.
| | | |
|---|---|---|
| H04J 3/12 | (2006.01) | |
| H04W 72/04 | (2009.01) | |
| H04W 28/26 | (2009.01) | |
| H04W 74/00 | (2009.01) | |
| H04W 74/02 | (2009.01) | |

(52) U.S. Cl.
CPC ........ *H04W 72/042* (2013.01); *H04W 72/0413* (2013.01); *H04W 28/26* (2013.01); *H04W 72/0446* (2013.01); *H04W 74/004* (2013.01); *H04W 74/006* (2013.01); *H04W 74/02* (2013.01)
USPC ........... 370/336; 370/345; 370/442; 370/458; 370/468; 370/522

(58) Field of Classification Search
None
See application file for complete search history.

(56) References Cited

U.S. PATENT DOCUMENTS

2001/0040883 A1 * 11/2001 Chang et al. ................. 370/344
2005/0243745 A1 11/2005 Stanwood et al.
(Continued)

FOREIGN PATENT DOCUMENTS

EP 1835670 A1 * 9/2007 ............ H04W 36/04
JP 2000341748 12/2000
(Continued)

OTHER PUBLICATIONS

Research in Motion UK Ltd., "A Mixed TTI TBF Configuration for Latency Reduction", Aug. 25-29, 2008, 3GPP TS GERAN #39, Tdoc GP-081270.*

(Continued)

*Primary Examiner* — Timothy J Weidner
(74) *Attorney, Agent, or Firm* — Finnegan, Henderson, Farabow, Garrett & Dunner LLP

(57) ABSTRACT

Methods and systems for performing allocation of mixed-type combinations of slots are provided. Specifically, in a single assignment message, an allocation of slots over two framed and slots over four frames is performed. These can be RTTI and BTTI blocks for example.

22 Claims, 13 Drawing Sheets

(56) References Cited

U.S. PATENT DOCUMENTS

| | | | |
|---|---|---|---|
| 2006/0018279 A1 | 1/2006 | Agrawal et al. | |
| 2008/0259880 A1* | 10/2008 | Parolari et al. | 370/337 |
| 2008/0310388 A1* | 12/2008 | Aghili et al. | 370/345 |
| 2009/0086686 A1* | 4/2009 | Rudolf et al. | 370/336 |
| 2009/0175232 A1* | 7/2009 | Kolding | 370/329 |
| 2010/0080125 A1* | 4/2010 | Olsson et al. | 370/235 |

FOREIGN PATENT DOCUMENTS

| | | |
|---|---|---|
| JP | 2002252873 | 9/2002 |
| WO | 2008/095748 | 8/2008 |
| WO | 2008/154624 | 12/2008 |
| WO | 2008/157770 | 12/2008 |

OTHER PUBLICATIONS

GP-062076—"Flexible timeslot assignment", Siemens, GERAN#32, Sophia Antipolis (France), Nov. 13-17, 2006.

GP-061666—"RTTI Blocks & (Extended) Dynamic Allocation", Siemens, GERAN#31, Denver (U.S.A.), Sep. 4-8, 2006.

G2-060192—"Analysis of DTM with reduced TTI", Siemens, GERAN2#29bis Sophia Antipolis (France), May 22-24, 2006.

GP-061664—"Working Assumptions for RTTI blocks", Siemens, GERAN#31, USA, Sep. 4-8, 2006.

GP-070272—"Uplink Allocation Strategies for RTTI TBFs", Siemens Networks, Nokia, GERAN#33, Korea, Feb. 12-16, 2007.

GP-070715—"Downlink Signalling in RTTI Mode", Ericsson, GERAN #34, Shenzhen, China, May 14-18, 2007.

3GPP TR 45.912 v7.2.0—"Feasibility study for evolved GSM/EDGE Radio Access Network (GERAN)", 2007.

3GPP TS 44.060 V7.11.0 "Mobile Station (MS)—Base Station System (BSS) interface; Radio Link Control/Medium Access Control (RLC/MAC) protocol", 2007.

3GPP TS 45.002 V7.6.0 "Multiplexing and multiple access on the radio path", 2007.

G2-070133—"On the definition of USF for RTTI" Montreal, CAN Mar. 26-30, 2007, Ericsson.

3GPP TS 45.002 V7.5.0, 2007.

3GPP TS 45.003 V7.2.0, 2007.

3GPP TS 24.008 V8.0, 2007.

International Search Report from PCT/CA2009/000174 dated Jun. 3, 2009.

\* cited by examiner

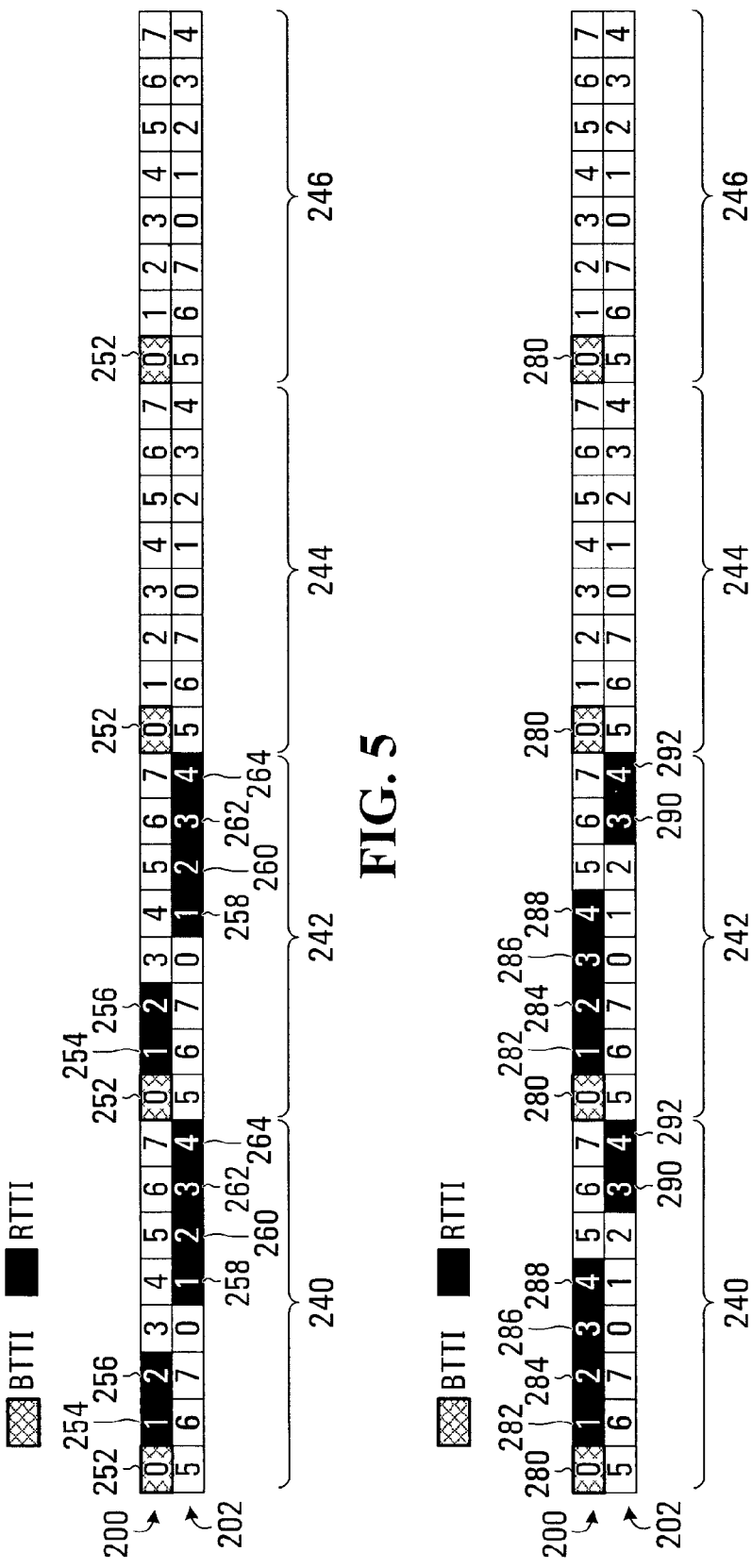

SYSTEMS AND METHODS FOR ASSIGNMENT AND ALLOCATION OF MIXED-TYPE COMBINATIONS OF SLOTS

FIELD

The application relates to systems and methods for communication between networks and user equipment using time division multiplexing.

BACKGROUND

Some wireless telecommunications systems employ a time division multiplexing scheme. The transmission time available for each of one or more frequencies is divided into slots. By way of example, in GSM each frequency is divided into eight slots collectively referred to as a frame, and these slots repeat in time.

In this description, assignment refers to signalling used to identify slots that are made available to a given UE. In this description, allocation refers to the actual reception/transmission of data on specific slots. An allocation will necessarily be a subset or all of the available assignment. Multiple UEs can have the same or overlapping assignments, and allocation will be used to avoid collisions. A particular allocation of slots within a frame or series of frames is typically repeated over a period of time. This is referred to as a TBF (temporary block flow). The TBF is a unidirectional entity: an uplink TBF relates to uplink assignment/allocation and a downlink TBF relates to downlink assignment/allocation. The slot numbering for the uplink is offset from the slot numbering for the downlink such that a downlink slot and an uplink slot with the same number can be assigned and allocated on both the downlink and the uplink without requiring the UE to receive and transmit at the same time. For a given user equipment (UE), the same physical time slot can be assigned and/or allocated for either the uplink or the downlink, but not both. However, due to the offset numbering scheme described above, slots having the same slot number can be assigned and allocated on both the uplink and downlink.

Multiple UEs in a given area share these time slots. Whenever each UE has data, it will, based on an uplink allocation mechanism, send data in the uplink direction. The network will also send data in the downlink direction on these slots to multiple mobiles. For example, in a first frame slot 0 may contain data for a first UE, while in a next frame, the same slot may contain data for a second UE. Since a slot is a very small time unit, a slot may be allocated to a UE over multiple consecutive frames. For example, a BTTI (Basic Transmit Time Interval) block consists of a slot allocated over four consecutive frames. For example, frame 1 slot 1, frame 2 slot 1, frame 3 slot 1 and frame 4 slot 1 make up a BTTI block. In some implementations, a frame is approximately 5 ms in duration, such that a BTTI block will span over four frames, or a 20 ms interval. A BTTI TBF is a TBF which uses BTTI blocks.

An RTTI (Reduced Transmit Time Interval) block uses the same frame structure introduced above, but an RTTI block consists of a pair of slots during a first frame, and a pair of slots during the next frame such that an RTTI block will span over two frames or a 10 ms interval. An RTTI TBF is a TBF which uses RTTI blocks. The transmission interval for an RTTI block compared to a BTTI block is reduced by half. Because of the pairing restriction, RTTI TBFs can only be used in assignments where there is an even number of uplink slots or an even number of downlink slots. For example, RTTI TBFs can be used in 2+2, 4+2, and 2+4 multi-slot-pairs of assignment (based on the UE multi-slot capability), where the "n+m" nomenclature indicates a pair of assignments including first assignment of n receive slots and a second assignment of m transmit slots. RTTI blocks are always assigned in pairs of slots. Thus, a 2+2 assignment represents a first assignment of a pair of slots for reception, and a second assignment of a pair of slots for transmission. A 4+2 assignment represents a first assignment of two pairs of slots for reception, and a second assignment of one pair of slots for transmission.

Specifically, there may be multiple classes of user equipment that each accommodate a specific maximum number of downlink or receive slots, a specific maximum number of uplink or transmit slots, a minimum time gap between receiving and transmitting, and a minimum time gap between transmitting and receiving. A particular set of 45 classes is defined in 3GPP TS 45.002 V7.6.0 Annex B.

In applications that would benefit from using RTTI TBFs, the multi-slot capability of certain UE multi-slot classes cannot be exploited fully due to the pairing requirement. In a specific example, a class 12 UE supports a maximum of four receive timeslots, a maximum of four transmit timeslots, such that the sum of the total timeslots allocated cannot exceed five. However, of the available RTTI multi-slot assignments, only the 2+2 pair of assignments will accommodate the constraints of the class 12 UE. This means that the user equipment has an additional receive or transmit slot capability that it is not able to utilize when in RTTI mode. In more general terms, for the specific class definitions referred to above, this situation exists where the desired number of transmit slots and/or the desired number of receive slots is an odd number that is greater than or equal to three.

This limitation can be addressed by assigning multiple TBFs to the UE for the uplink and/or the downlink. For example, the 3+2 or 2+3 capability of a class 12 UE could be implemented with 2+2 RTTI TBF pair of assignments in combination with a BTTI TBF assignment in the downlink or uplink respectively. Multiple TBFs may be appropriate when the UE is supporting multiple PDP (packet data protocol) contexts that have different QoS (quality of service) or other service parameters. However setting up and managing multiple TBFs causes an increase in signalling load, and requires support of this feature on both the network and the UE. This solution is inappropriate when a single application (for example FTP, HTTP) needs to benefit from RTTI and also at the same time needs to exploit the full multi-slot capability of the UE in the limiting cases described above.

SUMMARY

According to one broad aspect, the disclosure provides a method in network access equipment comprising: in respect of downlink time division multiple access communication using slots, transmitting a single assignment message containing an assignment of a first mixed-type combination of slots to a single flow.

According to another broad aspect, the disclosure provides a method in user equipment (UE) comprising: in respect of downlink time division multiple access communication using slots, receiving an assignment in a single assignment message that assigns a first mixed-type combination of slots to a single flow.

According to another broad aspect, the disclosure provides a user equipment comprising: a receive module, a determination module and a transmission module; the receive module configured to receive a message indicating an assignment of a mixed TTI TBF for downlink communications; the determination module configured to decode the message to determine the assignment; the receive module receiving based on the mixed TTI TBF assignment.

According to another broad aspect, the disclosure provides a network access equipment comprising: a receive module, a selection module and a transmission module; the selection module configured to assign a mixed TTI TBF assignment for a UE and to instruct the transmission module to signal the mixed TTI TBF assignment to the UE; the receive module and transmission module configured to receive and/or transmit using an allocation of the mixed TTI TBF assignment.

According to another broad aspect, the disclosure provides a method in network access equipment comprising: in respect of time division multiple access communication using slots, transmitting a single assignment message containing an assignment of a first mixed-type combination of slots to a single flow.

According to another broad aspect, the disclosure provides a method comprising: using an RTTI PACCH (packet associated control channel) to carry signalling information in respect of a mixed TTI TBF.

According to another broad aspect, the disclosure provides a method comprising: transmitting/receiving two RLC blocks with BSNs i, j where i<j, using a slot-pair slota and slotb assigned to carry an RTTI block and a slotc assigned to carry a BTTI block; if slota and slotb are allocated in the first two TDMA frames (first 10 ms) of a basic 20 ms time unit block, then the RLC block with BSN i is transmitted/received as an RTTI block on slot-pair slota and slotb and the RLC block with BSN j is transmitted/received in BTTI mode on slotc; if slota and slotb are allocated in the last two TDMA frames (next 10 ms) of a basic 20 ms time unit block, then: if both slota and slotb are <slotc then the RLC block with BSN i is transmitted/received as an RTTI block on slot-pair slota and slotb and the RLC block with BSN j is transmitted/received in BTTI mode on slotc; else the RLC block with BSN i is transmitted/received in BTTI mode on slotc and the RLC block with BSN j is transmitted/received as an RTTI block on slot-pair slota and slotb.

According to another broad aspect, the disclosure provides a method of performing uplink allocation comprising: transmitting/receiving a USF on the first slot of a pair of downlink slots corresponding with an assigned uplink RTTI block, the USF sent over four downlink frames, and a USF on one or more downlink slots having corresponding assigned uplink BTTI block(s) to allocate an RTTI block on both slots of the corresponding uplink timeslot pair in the first two TDMA frames (i.e. TDMA frames one and two of the following basic radio block period(s)) and a BTTI block on each uplink slot assigned in BTTI mode for which the corresponding downlink slot containing a USF, on all four TDMA frames of the following basic radio block period(s) (i.e. the four frames following the four frames containing the USF); transmitting/receiving a USF on the second slot of a pair of downlink slots corresponding with an assigned uplink RTTI block, the USF sent over four downlink frames, and a USF on one or more downlink slots having corresponding assigned uplink BTTI block(s) to allocate an RTTI block on both slots of the corresponding uplink timeslot-pair in the next two TDMA frames (i.e. TDMA frames three and four of the following basic radio block period(s)) and a BTTI block on each uplink slot assigned in BTTI mode for which the corresponding downlink slot contained a USF, on all four TDMA frames of the following basic radio block period(s) (i.e. the four frames following the four frames containing the USF); transmitting/receiving USFs on the first and second slots of a pair of downlink slots corresponding with an assigned uplink RTTI block, the USF sent over four downlink frames, and a USF on one or more downlink slots having corresponding assigned uplink BTTI block(s) to allocate a first RTTI block on both slots of the corresponding uplink timeslot-pair on the first two TDMA frames in the next basic radio block period and a second RTTI block on both slots of the corresponding uplink timeslot-pair on the next two TDMA frames (frames three and four) in the following basic radio block period, and one BTTI block on each uplink slot assigned in BTTI mode for which the corresponding downlink slot contained a USF, on four TDMA frames of the following basic radio block period (i.e. within the four frames following the four frames containing the USF).

According to another broad aspect, the disclosure provides a method of performing uplink allocation comprising: transmitting/receiving a USF on the first slot of a pair of downlink slots corresponding with an assigned uplink RTTI block, the USF sent over four downlink frames to allocate resources in the first two TDMA frames of the following basic radio block period(s) on the corresponding uplink slot-pair for RTTI block transmission and all assigned uplink slot-pairs with higher numbered timeslots than the corresponding uplink slot-pair for RTTI block transmission, and to allocate resources on all assigned uplink slots for BTTI block transmission with higher timeslot numbers than any slot of the corresponding uplink slot-pair; transmitting/receiving a USF on the second slot of a pair of downlink slots corresponding with an assigned uplink RTTI block, the USF sent over four downlink frames to allocate resources in the second two TDMA frames of the following basic radio block period(s) on the corresponding uplink slot-pair for RTTI block transmission and all assigned uplink slot-pairs with higher numbered timeslots than the corresponding uplink slot-pair for RTTI block transmission and to allocate resources on all assigned uplink slots for BTTI block transmission with higher timeslot numbers than any slot of the corresponding uplink slot-pair.

According to another broad aspect, the disclosure provides a network access equipment comprising: a receive module, a selection module and a transmission module; the selection module configured to assign a mixed TTI TBF assignment for a UE and to instruct the transmission module to signal the mixed TTI TBF assignment to the UE; the receive module and transmission module configured to receive and/or transmit using an allocation of the mixed TTI TBF assignment.

According to another broad aspect, the disclosure provides a method in user equipment (UE) comprising: in respect of time division multiple access communication using slots, receiving an assignment in a single assignment message that assigns the first mixed-type combination of slots to a single flow.

According to another broad aspect, the disclosure provides a user equipment comprising: a receive module, a determination module and a transmission module; the receive module configured to receive a message indicating an assignment of a mixed TTI TBF; the determination module configured to decode the message to determine the assignment; the receive module and/or the transmission module receiving and/or transmitting in accordance with an allocation of the mixed TTI TBF assignment.

According to another broad aspect, the disclosure provides a network access equipment comprising: a receive module, a selection module and a transmission module; the selection module configured to assign a mixed TTI TBF assignment for a UE and to instruct the transmission module to signal the mixed TTI TBF assignment to the UE; the receive module and transmission module configured to receive and/or transmit using an allocation of the mixed TTI TBF assignment.

Other embodiments provide one or more computer-readable media having computer executable instructions stored thereon for executing, or coordinating the execution of one or more of the methods summarized above, or detailed below.

BRIEF DESCRIPTION OF THE DRAWINGS

Embodiments of the disclosure will now be described with reference to the attached drawings in which:

FIGS. 3 to 12 illustrate examples of mixed TTI (MTTI) TBFs;

DETAILED DESCRIPTION OF THE EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
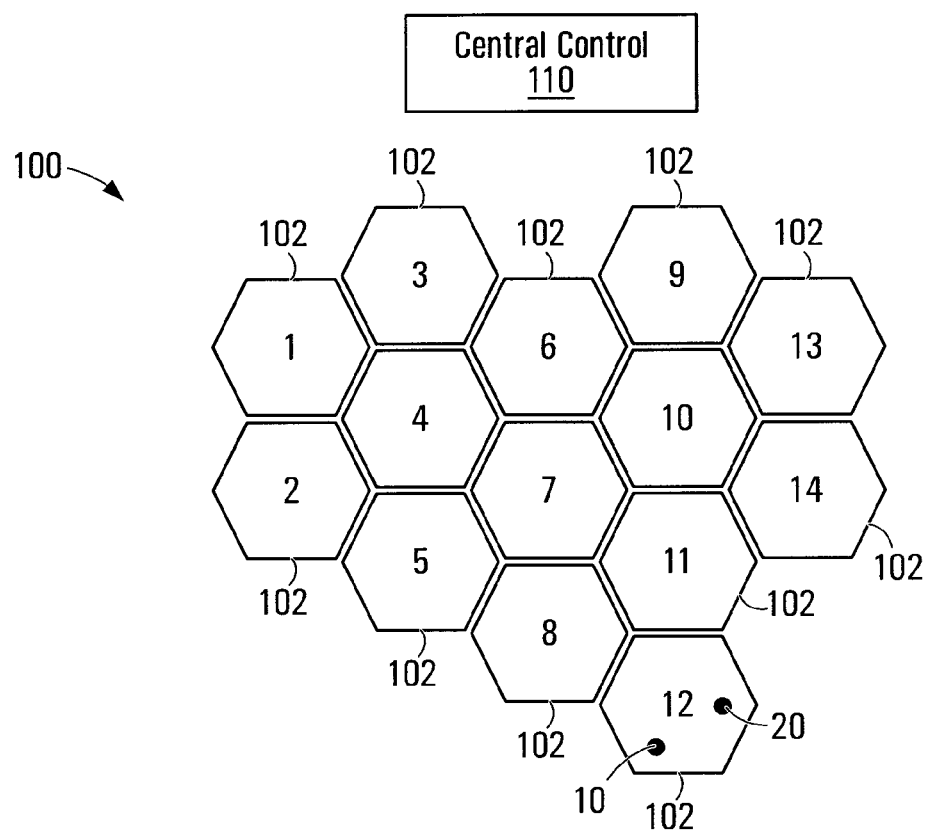
FIG. 1 is an illustration of a cellular network according to an embodiment of the disclosure.

FIG. 1 illustrates an exemplary cellular network 100 according to an embodiment of the disclosure. The cellular network 100 may include a plurality of cells $102_1$, $102_2$, $102_3$, $102_4$, $102_5$, $102_6$, $102_7$, $102_8$, $102_9$, $102_{10}$, $102_{11}$, $102_{12}$, $102_{13}$, and $102_{14}$ (collectively referred to as cells 102). As is apparent to persons of ordinary skill in the art, each of the cells 102 represents a coverage area for providing cellular services of the cellular network 100 through communication from a network access equipment (for example but not limited to a BSS (base station system) or eNB). While the cells 102 are depicted as having non-overlapping coverage areas, persons of ordinary skill in the art will recognize that one or more of the cells 102 may have partially overlapping coverage with adjacent cells. In addition, while a particular number of the cells 102 are depicted, persons of ordinary skill in the art will recognize that a larger or smaller number of the cells 102 may be included in the cellular network 100.

One or more UEs 10 may be present in each of the cells 102. Although only one UE 10 is depicted and is shown in only one cell $102_{12}$, it will be apparent to one of skill in the art that a plurality of UEs 10 may be present in each of the cells 102. A network access equipment 20 in each of the cells 102 performs functions similar to those of a traditional base station. That is, the network access equipments 20 provide a radio link between the UEs 10 and other components in a telecommunications network. While the network access equipment 20 is shown only in cell $102_{12}$, it should be understood that network access equipment would be present in each of the cells 102. A central control 110 may also be present in the cellular network 100 to oversee some of the wireless data transmissions within the cells 102.

Figure 2:
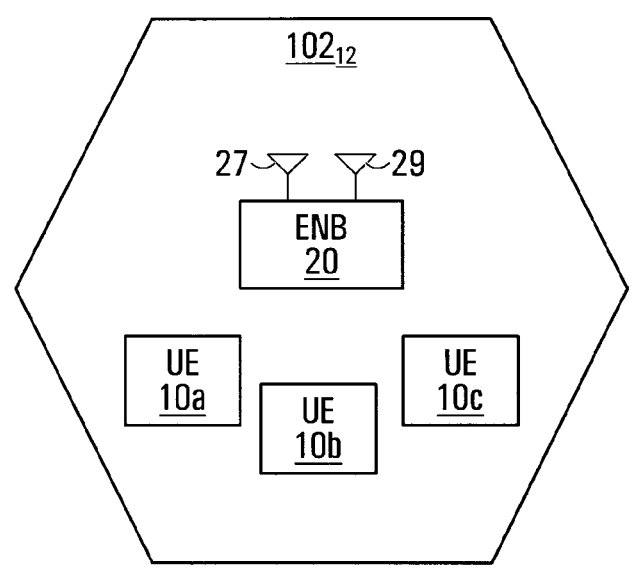
FIG. 2 is an illustration of a cell in a cellular network according to an embodiment of the disclosure.

FIG. 2 depicts a more detailed view of the cell $102_{12}$. The network access equipment 20 in cell $102_{12}$ may promote communication via a transmitter 27, a receiver 29, and/or other well known equipment. Similar equipment might be present in the other cells 102. A plurality of UEs 10 are present in the cell $102_{12}$, as might be the case in the other cells 102. In the present disclosure, the cellular systems or cells 102 are described as engaged in certain activities, such as transmitting signals; however, as will be readily apparent to one skilled in the art, these activities would in fact be conducted by components comprising the cells.

In each cell, the transmissions from the network access equipment 20 to the UEs 10 are referred to as downlink transmissions, and the transmissions from the UEs 10 to the network access equipment 20 are referred to as uplink transmissions. The UE may include any device that may communicate using the cellular network 100. For example, the UE may include devices such as a cellular telephone, a laptop computer, a navigation system, or any other devices known to persons of ordinary skill in the art that may communicate using the cellular network 100.

A mixed TTI (MTTI) TBF is provided that is a single TBF, assigned with a single TBF assignment message, that combines at least one RTTI block with at least one BTTI block. In an MTTI TBF, one or more pairs of slots carry respective RTTI blocks over two frames, and one or more single slots (i.e. a slot that does not form part of a pair) carry BTTI blocks over four frames. MTTI TBF assignment and allocation may be used for the downlink and/or the uplink.

In some embodiments, an assignment of an MTTI TBF includes an assignment for the uplink only, or for the downlink only. In this case, a first assignment is made for the uplink and/or a second assignment is made for the downlink, and one or both of these can be MTTI TBF assignments. The uplink and downlink assignments are not necessarily symmetrical. All of the detailed examples presented below assume this type of assignment.

In some embodiments, an assignment of an MTTI TBF is part of a single assignment message that includes an assignment for the uplink and the downlink. Again, the uplink and downlink assignments are not necessarily symmetrical.

Downlink and Uplink Assignment

New MTTI TBFs are defined, and when such a TBF is assigned to a given UE, MTTI TBF assignment information is signaled to the user equipment. The user equipment that receives the MTTI TBF assignment information will know precisely the number of and location of timeslots assigned to each block type.

The following is a specific example of MTTI TBF assignment information that can be used to specify any of the MTTI TBF assignments described in detail below. A downlink MTTI TBF assignment identifies which downlink slots will use BTTI configuration and which downlink slots will use RTTI configuration. For example the information might include one or more of:

an indication that the assignment is a mixed TTI TBF assignment;

indication of slot(s) carrying BTTI block(s)

indication of slot(s) carrying RTTI block(s) frequency

More details of a specific example of a downlink assignment message are provided in Appendix A.

Uplink assignment is more complicated, and includes information that specifies the manner of performing uplink allocation. The information might include one or more of:

an indication that the assignment is a mixed TTI TBF assignment;

indication of slot(s) carrying BTTI block(s)

indication of slot(s) carrying RTTI block(s)

one or more parameters in respect of uplink allocation frequency where the fields are the same as for the downlink assignment except for the inclusion of one or more parameters in respect of uplink allocation. This may for example indicate the type of uplink allocation to be performed (detailed examples provided below), and/or include specific details for a particular uplink allocation approach, such as USF locations. In some embodiments, the uplink allocation mechanism is dictated uniquely by the assignment such that it is not necessary to signal this. More details of a specific example of an uplink assignment message are provided in Appendix A.

Downlink Allocation

For downlink allocation, after assignment, the network transmits using some or all of the assigned slots. Each UE will receive signals from the network on the assigned downlink slots and determine whether there is any content addressed to itself, which infers that those particular slots were allocated to the UE. All, a subset, or none of the slots assigned to a UE may be allocated to the UE in a given frame.

Uplink Allocation

In some embodiments, an allocation mechanism that is based on BTTI USF mode is employed. The conventional use of BTTI USF mode involves transmission of a BTTI USF on a slot over four downlink frames as opposed to the conventional use of an RTTI USF mode which involves transmission of an RTTI USF on two slots over two downlink frames.

A modified BTTI USF allocation mechanism is provided which involves using BTTI USFs to perform allocation in respect of MTTI TBFs. Various specific examples of how modified BTTI USF allocation can be performed are detailed below. In some embodiments, the actual format of the modified BTTI USF is identical to that of the conventional BTTI USF. A respective USF is included in each of one or more slots over four frames. However, the information conveyed by the BTTI USF is context specific, and will depend on whether it is in respect of the allocation of a conventional BTTI only uplink TBF, the allocation of conventional RTTI only uplink TBF, or the allocation of a mixed TTI (MTTI) uplink TBF as defined herein. Note that conventional BTTI USF allocation differs from the above in that it is used to allocate either a BTTI TBF, an RTTI TBF, or a pair of RTTI TBFs, but not a combination of both BTTI and RTTI TBFs. When an MTTI uplink TBF exists and allocation is performed using a BTTI USF, this is considered a "modified" BTTI USF approach, since it is being used to signal something other than the conventional allocation (i.e. BTTI uplink TBF only or RTTI uplink TBF only).

1) Dynamic Allocation Approach

A first example of uplink allocation that can be employed is referred to as conventional dynamic allocation (DA). Conventional DA allows for uplink allocation of a BTTI block or an RTTI block, but not both.

Using conventional DA, to allocate an uplink BTTI block, in a downlink slot, a BTTI USF (uplink status flag) in a downlink BTTI slot is used to allocate a BTTI block in the corresponding uplink slot. With conventional DA, the corresponding uplink slot has the same number as the downlink slot containing the USF. In some embodiments, a variant of conventional DA may be employed in which the corresponding uplink slot can be an uplink slot having an uplink slot number that is the same or different from the downlink slot number of the slot containing the BTTI USF. In this case, the downlink slot "corresponds" with the uplink slot in the sense that it has been designated to carry the USF for uplink allocation.

Using conventional DA, to allocate an uplink RTTI block, a BTTI USE (uplink status flag) is transmitted in one or both of two downlink slots that correspond with a pair of uplink slots assigned to an uplink RTTI block. The downlink slots "correspond" with the uplink slots in the sense that they have been designated to carry the USF for uplink allocation. The two uplink slots being allocated may have different uplink slot numbers than the downlink slot numbers of the slot(s) carrying the BTTI USF(s).

More specifically, the four allocations possible with conventional DA are:

a) USF on a downlink slot assigned to a downlink BTTI block sent over four downlink frames: the UE will transmit a BTTI block on the slot of the corresponding uplink timeslot in four TDMA frames;

b) USF on the first slot of a pair of downlink slots corresponding with an assigned uplink RTTI block, the USF sent over four downlink frames: the UE will transmit an RTTI block on both slots of the corresponding uplink timeslot-pair in the first two TDMA frames (i.e. TDMA frames one and two of the following basic radio block period(s));

c) USF on the second slot of a pair of downlink slots corresponding with an assigned uplink RTTI block, the USF sent over four downlink frames: the UE will transmit an RTTI block on both slots of the corresponding uplink timeslot-pair in the next two TDMA frames (i.e. TDMA frames three and four of the following basic radio block period(s));

d) USF on the first and second slot of a pair of downlink slots corresponding with an assigned uplink RTTI block, the USF sent over four downlink frames: the UE will transmit a first RTTI block on both slots of the corresponding uplink timeslot-pair on the first two TDMA frames in the next basic radio block period and a second RTTI block on both slots of the corresponding uplink timeslot-pair on the next two TDMA frames (frames three and four) in the following basic radio block period.

2) Modified Dynamic Allocation

With modified dynamic allocation, the DA approach described above is modified to cover the allocation of an MTTI TBF. Specifically, the following allocations are possible using modified dynamic allocation:

a) USF on the first slot of a pair of downlink slots corresponding with an assigned uplink RTTI block, the USF sent over four downlink frames, and a USF on one or more downlink slots having corresponding assigned uplink BTTI block(s): the UE will transmit an RTTI block on both slots of the corresponding uplink timeslot pair in the first two TDMA frames (i.e. TDMA frames one and two of the following basic radio block period(s)) and a BTTI block on each uplink slot assigned in BTTI mode for which the corresponding downlink slot contained a USF, on all four TDMA frames of the following basic radio block period(s) (i.e. the four frames following the four frames containing the USF);

b) USF on the second slot of a pair of downlink slots corresponding with an assigned uplink RTTI block, the USF sent over four downlink frames, and a USF on one or more downlink slots having corresponding assigned uplink BTTI block(s): the UE will transmit an RTTI block on both slots of the corresponding uplink timeslot-pair in the next two TDMA frames (i.e. TDMA frames three and four of the following basic radio block period(s)) and a BTTI block on each uplink slot assigned in BTTI mode for which the corresponding downlink slot contained a USF, on all four TDMA frames of the following basic radio block period(s) (i.e. the four frames following the four frames containing the USF);

c) USF on the first and second slots of a pair of downlink slots corresponding with an assigned uplink RTTI block, the USF sent over four downlink frames, and a USF on one or more downlink slots having corresponding assigned uplink BTTI block(s): the UE will transmit a first RTTI block on both slots of the corresponding uplink timeslot-pair on the first two TDMA frames in the next basic radio block period and a second RTTI block on both slots of the corresponding uplink timeslot-pair on the next two TDMA frames (frames three and four) in the following basic radio block period, and one BTTI block on each uplink slot assigned in BTTI mode for which the corresponding downlink slot contained a USF, on four TDMA frames of the following basic radio block period (i.e. within the four frames following the four frames containing the USF).

3) Extended Dynamic Allocation

With conventional extended dynamic allocation (EDA), the following applies for an uplink RTTI TBF that receives USFs in BTTI USF mode:

a) USF on the first slot of a pair of downlink slots corresponding with an assigned uplink RTTI block, the USF sent over four downlink frames allocates resources in the first two TDMA frames of the following basic radio block period(s) on the corresponding uplink slot-pair for RTTI block transmission and all assigned uplink slot-pairs with higher numbered timeslots than the corresponding uplink slot-pair for RTTI block transmission in the first two TDMA frames of the following basic radio block period;

b) USF on the second slot of a pair of downlink slots corresponding with an assigned uplink RTTI block, the USF sent over four downlink frames allocates resources in the second two TDMA frames of the following basic radio block period(s) on the corresponding uplink slot-pair for RTTI block transmission and all assigned uplink slot-pairs with higher numbered timeslots than the corresponding uplink slot-pair for RTTI block transmission in the first two TDMA frames of the following basic radio block period;

With conventional extended dynamic allocation, the following applies for an uplink BTTI TBF:

c) for a BTTI uplink TBF, a USF in a given downlink timeslot means that the uplink timeslot having the same number as the given downlink timeslot and all assigned uplink slots with higher timeslot numbers than that slot are being allocated for BTTI block transmission.

4) Modified EDA

With modified extended dynamic allocation, the extended DA approach described above is modified to cover the allocation of an MTTI TBF. Modified EDA can be used to perform allocation in respect of some uplink assignments that include at least one RTTI block on an assigned pair of slots and at least one BTTI block on an assigned slot. Specifically, the following allocations are possible using modified dynamic allocation:

a) USF on the first slot of a pair of downlink slots corresponding with an assigned uplink RTTI block, the USF sent over four downlink frames allocates resources in the first two TDMA frames of the following basic radio block period(s) on the corresponding uplink slot-pair for RTTI block transmission and all assigned uplink slot-pairs with higher numbered timeslots than the corresponding uplink slot-pair for RTTI block transmission, and allocates resources on all assigned uplink slots for BTTI block transmission with higher timeslot numbers than any slot of the corresponding uplink slot-pair;

b) USF on the second slot of a pair of downlink slots corresponding with an assigned uplink RTTI block, the USE sent over four downlink frames allocates resources in the second two TDMA frames of the following basic radio block period(s) on the corresponding uplink slot-pair for RTTI block transmission and all assigned uplink slot-pairs with higher numbered timeslots than the corresponding uplink slot-pair for RTTI block transmission and allocates resources on all assigned uplink slots for BTTI block transmission with higher timeslot numbers than any slot of the corresponding uplink slot-pair.

Use of PACCH for Mixed TTI TBF Signalling

The references to slots in the above for data transmission refers to PDCH transmission (packet data channel). In conventional systems, the RTTI PACCH (packet associated control channel) is used to carry signalling information about an RTTI TBF, using the same slots that were assigned for the particular TBF. In some embodiments, signalling that is consistent with the RTTI PACCH is used to carry signalling information about a mixed TTI TBF. This will be referred to as a modified RTTI PACCH. The format of the modified RTTI PACCH in some embodiments is completely identical to the existing RTTI PACCH. This can be done in the uplink direction, the downlink direction or both. In a particular example, the modified RTTI PACCH includes an indication of which blocks from a set of RLC (radio link control) blocks were received correctly or incorrectly. This can be done irrespective of the type of the RLC blocks (BTTI vs. RTTI), so no change to the signalling is needed.

Figure 3:
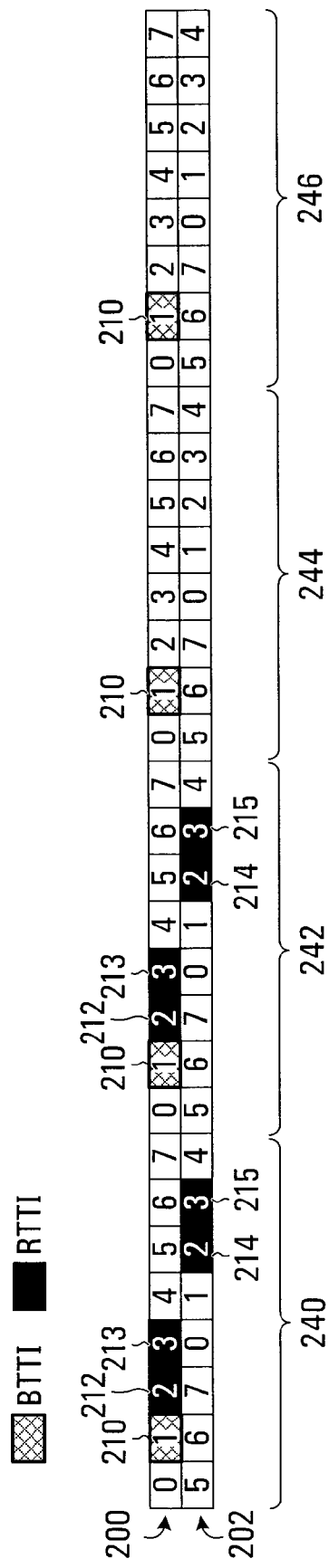

Assignment with an Odd Slot Allocated for Downlink Transmission 3+2 Assignment Example Referring to FIG. 3, a first detailed example will be described. FIG. 3 shows a mixed TTI TBF for the downlink that employs 3 downlink slots and a TBF for the uplink that employs 2 uplink slots. This assignment is appropriate for classes 10,11,12,33 and higher except classes 35 or 40 which only have one uplink timeslot maximum. In this example, and the others that follow, time runs in the horizontal direction; the top row 200 represents downlink slot assignments, and the bottom row 202 represents uplink slot assignments. There is a repeating pattern of 8 slots making up a frame. Four frames are shown at 240,242,244,246. The numbering of the slots is offset for the downlink vs. the uplink. Specifically, for the example illustrated, the uplink slot "0" occurs 3 slots after the downlink slot "0".

The specific assignment shown includes a downlink BTTI block 210 on slot 1 over all four frames 240,242,244,246 and a downlink RTTI block 212,213 on downlink slots 2 and 3 over the first two frames 240,242. There is an uplink RTTI block 214,215 on uplink slots 2 and 3 over the first two frames 240,242. This results in a one slot gap between transmission and reception, consistent with the multi-slot capabilities of the classes under consideration.

The specific assignment shown could also be shifted one slot to the left, or one, two, three or four slots to the right without changing the principles described and without changing the multi-slot capability required. That is to say, more generally, a 3+2 (downlink+uplink) assignment is provided employing any three consecutive downlink slots comprising a first, second and third downlink slot, and employing two uplink slots corresponding with the second and third consecutive downlink slots such that there is a BTTI block in the first downlink slot, an RTTI block in the second and third downlink slots, and an RTTI block in the two uplink slots.

The particular set of permutations available for a given class is limited. For example, if the class requires a one slot gap between transmission and reception, then reversing the order of the BTTI block 210 and the RTTI block 212,213 would not work. This would result in RTTI downlink transmission on slots 1,2, BTTI downlink transmission on slot 3, followed by uplink transmission on slots 1 and 2, and there would be no gap between the uplink transmission and the downlink transmission.

In a particular example of uplink allocation for the example of FIG. 3, conventional dynamic allocation can be employed as detailed above.

With the described assignment, there is no slot that might have to carry different TTI types (RTTI vs. BTTI) in the opposite directions.

3+3 Assignment—First Example

Figures 4A, 4B:
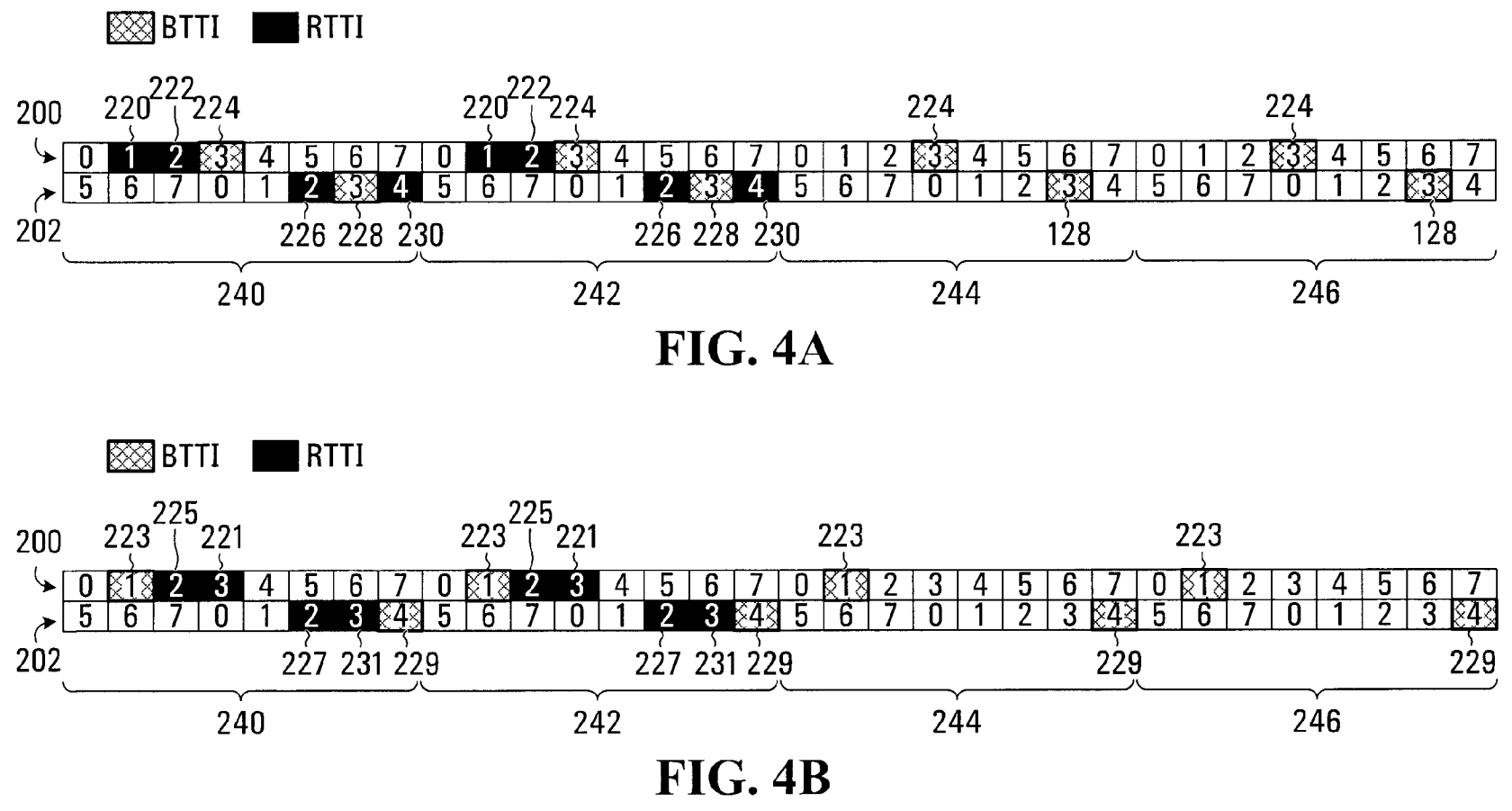

Referring to FIG. 4A, a second detailed example will be described. FIG. 4A shows a mixed TTI TBF accommodating 3 downlink slots, and a mixed TTI TBF accommodating 3 uplink slots. This assignment is appropriate for UEs of class 32,33,34, for example. The specific allocation shown includes a downlink RTTI block 220,222 on downlink slots 1 and 2 during the first two frames 240,242 and a downlink BTTI block 224 on downlink slot 3 on four frames 240,242, 244,246. On the uplink, there is an uplink RTTI block 226, 230 on slots 2 and 4 allocated on the first two frames 240,242, and a BTTI block 228 on slot 3 between slots 2 and 4 used for the RTTI block 226,230. In this case, slot 1 on the uplink is not included in the assignment, as it would violate the multi-slot capability of the user equipment.

The specific assignment shown could also be shifted one slot to the left, or one, two or three slots to the right without changing the principles described and without changing the multi-slot capability required. That is to say a 3+3 (downlink+uplink) assignment is provided employing a first three consecutive downlink slots out of any four consecutive downlink slots comprising a first, second, third and fourth downlink slots, and employing three uplink slots corresponding with the second, third and fourth downlink slots such that there is an RTTI block in the first and second downlink slots, a BTTI block in the third downlink slot, an RTTI block in uplink slots corresponding with the second and fourth downlink slots and a BTTI block in the uplink slot corresponding with the third downlink slot.

The details of uplink allocation for the example of FIG. 4A will be provided below in the section detailing assignments with odd numbers of uplink slots.

3+3 Assignment—Second Example

Referring to FIG. 4B, another detailed 3+3 example will be described. FIG. 4B shows an MTTI TBF accommodating 3 downlink slots and an MTTI TBF accommodating 3 uplink slots. This assignment is appropriate for UEs of class 32,33, 34, for example. The specific allocation shown includes a downlink BTTI block 223 on downlink slot 1 during the first four frames 240,242,244,246, and a downlink RTTI block 225,221 on downlink slots 2 and 3 during the first two frames 240,242. On the uplink, there is an uplink RTTI block 227, 231 on slots 2 and 3 on the first two frames 240,242, and a BTTI block 229 on slot 4 during frames 240,242,244,246.

The specific assignment shown could also be shifted one slot to the left, or one, two or three slots to the right without changing the principles described and without changing the multi-slot capability required. That is to say, 3+3 (downlink+uplink) MTTI assignments are provided employing a first three consecutive downlink slots out of any four consecutive downlink slots comprising first, second, third and fourth downlink slots, and employing three uplink slots corresponding with the second, third and fourth downlink slots such that there is a BTTI block in the first downlink slot, an RTTI block in the second and third downlink slots, an RTTI block in the uplink slots corresponding with the second and third downlink slots, and a BTTI block in the uplink slot corresponding with the fourth downlink slot.

The details of uplink allocation for the example of FIG. 4B will be provided below in the section detailing assignments with odd numbers of uplink slots.

3+4 Assignment Example

Referring now to FIG. 5, a third detailed example of mixed mode TTF assignment will be described. FIG. 5 shows an example of an MTTI TBF for 3 slots on the downlink, and a four slot RTTI uplink assignment (classes 43-45). The downlink assignment of FIG. 5 is basically the same as that of FIG. 3. Specifically, for the downlink, the allocation includes BTTI block 252 in slot 0 over four frames 240,242,244,246, and RTTI block 254, 256 in slots 1 and 2 over two frames 240,242. For the uplink, there is a first RTTI block 258,260 in slots 1 and 2, and a second RTTI block 262,264 in slots 3 and 4.

The example of FIG. 5 can be shifted to the right by one, two or three slots. That is to say a 3+4 (downlink+uplink) assignment is provided employing a first three consecutive downlink slots out of any five consecutive downlink slots comprising first, second, third, fourth and fifth downlink slots, and employing four uplink slots corresponding with the second, third, fourth and fifth downlink slots such that there is a BTTI block in the first downlink slot, an RTTI block in the second and third downlink slots, an RTTI block in uplink slots corresponding with the second and third downlink slots and an RTTI block in uplink slots corresponding with the fourth and fifth downlink slots.

In a particular example of uplink allocation for the example of FIG. 5, the same approach may be used as is used for conventional 2+4 allocation, for example, by using the above described EDA approach.

5+2 Assignment Example

Referring now to FIG. 6, a fourth detailed example of mixed mode TBF assignment will be described. FIG. 6 shows an example of a mixed mode TTI TBF using 5 downlink slots, and an uplink TBF that uses two slots (appropriate for classes 41-45 for example). For the example of FIG. 6, the downlink allocation provides a BTTI block 280 in slot 0 over frames 240,242,244,246, an RTTI block 282,284 in slots 1 and 2 over frames 240,242 and an RTTI block 286,288 in slots 3 and 4 over frames 240,242. For the uplink, there is an RTTI block 290,292 in slots 3 and 4 over frames 240,242.

The example of FIG. 6 can be shifted to the right by one, two or three slots. That is to say a 5+2 (downlink+uplink) mixed TTI TBF is provided employing any five consecutive downlink slots comprising a first, second, third, fourth and fifth downlink slots, and employing two uplink slots corresponding with the fourth and fifth downlink slots such that there is a BTTI block in the first downlink slot, an RTTI block in the second and third downlink slots, an RTTI block in the fourth and fifth downlink slots, and an RTTI block in uplink slots corresponding with the fourth and fifth downlink slots.

In a particular example of uplink allocation for the example of FIG. 6, uplink allocation can be achieved using conventional dynamic allocation as described above.

Figures 7, 8:
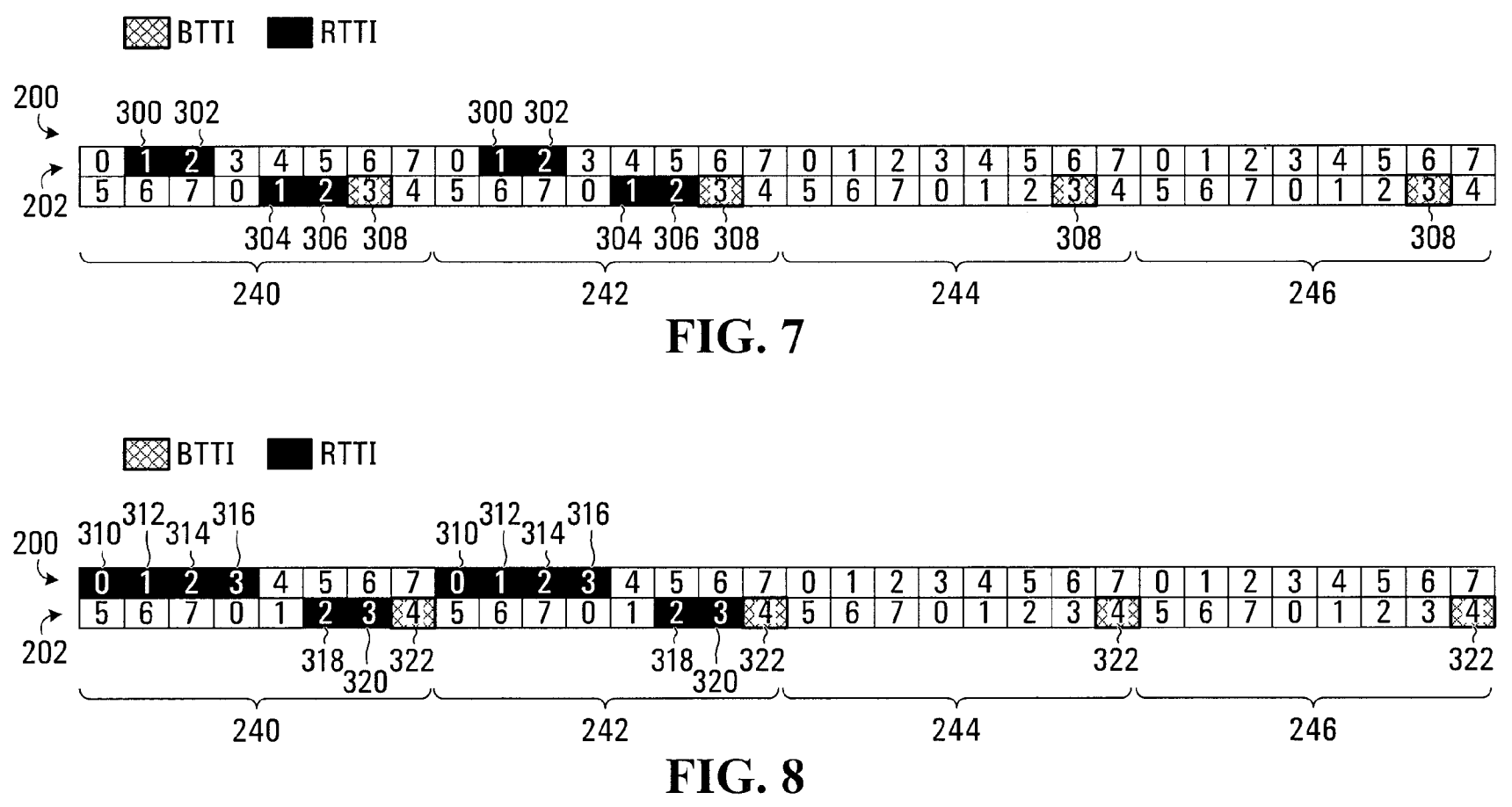

Allocations with an Odd Slot Allocated for Uplink Transmission 2+3 Assignment Example Referring now to FIG. 7, a fifth detailed example will be presented. FIG. 7 shows a downlink RTTI TBF with 2 downlink slots and an uplink mixed mode TBF employing 3 uplink slots. This allocation is appropriate for classes 11,12,33 and up except for classes 30, 31, 40, and 41 which have a transmit capability of maximum 2 timeslots. The specific allocation shown includes a downlink RTTI block 300,302 on downlink slots 1 and 2 during frames 240,242. On the uplink, there is an uplink RTTI block 304,306 allocated on uplink slots 1 and 2 during frames 240,242 and a BTTI block 308 allocated on slot 3 during frames 240,242,244,246. In this case slot-pair 1 and 2 carries RTTI blocks in both the uplink and downlink directions, while slot 3 carries a BTTI block in the uplink direction only. If an uplink RTTI block (304,306) is also allocated in frames 244 and 246, then 3 blocks are transmitted within a 20 ms basic radio block period in the uplink direction using a mixed TTI TBF.

The assignment of FIG. 7 can be moved to the left by one slot, or to the right by one, two, three or four slots. That is to say a 2+3 (downlink+uplink) assignment is provided employing a first two consecutive downlink slots out of any three consecutive downlink slots comprising first, second, third downlink slots, and employing three uplink slots corresponding with the first, second and third downlink slots such that there is a RTTI block in the first and second downlink slots, an RTTI block in the uplink slots corresponding with the first and second downlink slots, and a BTTI block in the uplink slot corresponding with the third downlink slot.

In a particular example of uplink allocation for the example of FIG. 7, the above-described modified extended dynamic allocation approach for uplink allocation can be used to allocate both the RTTI and BTTI blocks in the uplink direction. For the specific example shown, it is assumed that downlink slots 1 and 2 are the downlink slots have that been defined to correspond with uplink slots 1 and 2. Thus, a USF in the downlink RTTI block 300,302 in one or both of slots 1 and 2 can be used to allocate the RTTI block 304,306 in uplink slots 1 and 2 during the first two frames, the next two frames, or all four frames and to allocate downlink slot 3 assigned to BTTI block 308 over the next four frames.

3+3 Assignment Example—First Example

Returning to the example of FIG. 4A, this was an example with an odd number of slots allocated for the uplink. Recall that in the above example downlink slot-pair 1 and 2 carry RTTI block 220,222 and downlink slot 3 carries BTTI block 224 in the downlink direction. Uplink slot-pair 2 and 4 is assigned for RTTI block 226,230, and slot 3 is assigned for BTTI block 228.

In a first example of uplink allocation for the example of FIG. 4A, the above-described modified dynamic allocation approach can be used for uplink allocation when the entire TBF is to be allocated. For the specific example shown, it is assumed that downlink slots 1 and 2 are the downlink slots that are defined to correspond with uplink slots 2 and 4 for the purpose of BTTI USF transmission for the RTTI block assignment. Thus, a USF in the downlink RTTI block 220,222 in one or both of slots 1 and 2 can be used to allocate the RTTI block 226,230 in uplink slots 2 and 4 during the first two frames, the next two frames, or all four frames. Downlink slot 3 assigned to BTTI mode is the same slot number as uplink slot 3 assigned to BTTI mode. A USF in downlink slot 3 allocates uplink slot 3 for BTTI block 228 in the next four frames. For the full allocation, a USF is needed in slots 1 and/or 2, and slot 3. When only the BTTI block 228 is being allocated, a USF flag in downlink slot 3 allocates the uplink BTTI block 228 in slot 3.

In a second example of uplink allocation for the example of FIG. 4A, the above-described modified extended dynamic allocation approach can be used for uplink allocation when the entire TBF is to be allocated. For the specific example shown, it is assumed that downlink slots 1 and 2 are defined to be the downlink slots that correspond with uplink slots 2 and 4 for the purpose of BTTI USF transmission for the RTTI block assignment. Thus, a USF in the downlink RTTI block 220,222 in slot 1, slot 2, or both slots 1 and 2 can be used to allocate the RTTI block 226,230 in uplink slots 2 and 4 during the first two frames, the next two frames, or all four frames respectively and to allocate any uplink slot assigned in BTTI mode having a higher number than either of slots 2 and 4, namely uplink slot 3 in this example, over the next four frames.

3+3 Assignment Example—Second Example

Returning to the example of FIG. 4B, this was an example with an odd number of slots allocated for the uplink, in which the odd slot used for a BTTI block was not between two slots for an RTTI block. For uplink allocation for this case, the above-described modified EDA approach can be used to allocate all of the uplink slots. For the specific example shown, it is assumed that downlink slots 2 and 3 are the downlink slots that have been defined to correspond with uplink slots 2 and 3. Thus, a USF in the downlink RTTI block 225,221 in one or both of slots 1 and 2 can be used to allocate the RTTI block 227,231 in uplink slots 2 and 3 during the first two frames, the next two frames, or all four frames and to allocate downlink slot 4 assigned to BTTI block 229 over the next four frames.

4+3 Assignment Example

Referring now to FIG. 8, another detailed example will be presented. FIG. 8 shows an RTTI TBF employing 4 slots for the downlink and a mixed TTI TBF employing 3 uplink slots. This assignment is appropriate for classes 41 to 45 for example. The specific allocation shown includes a downlink RTTI block 310,312 on downlink slots 0 and 1 during frames 240,242 and a downlink RTTI block 314,316 on downlink slots 2 and 3 during frames 240,242. On the uplink, there is an uplink RTTI block 318,320 on uplink slots 2 and 3 during frames 240,242 and an uplink BTTI block 322 on slot 4 during frames 240,242,244,246.

The assignment of FIG. 8 can be moved to the right by one, two or three slots. That is to say a 4+3 (downlink+uplink) assignment is provided employing a first four consecutive downlink slots out of any five consecutive downlink slots comprising first, second, third, fourth and fifth downlink slots, and employing three uplink slots corresponding with the third, fourth and fifth downlink slots such that there is an RTTI block in the first and second downlink slots, an RTTI block in the third and fourth downlink slots, an RTTI block in the uplink slots corresponding with the third and fourth downlink slots, and a BTTI block in the uplink slot corresponding with the fifth downlink slot.

The uplink allocation for FIG. 8 can be done in the same manner as described for FIG. 7.

2+5 Allocation Example

Figure 9:
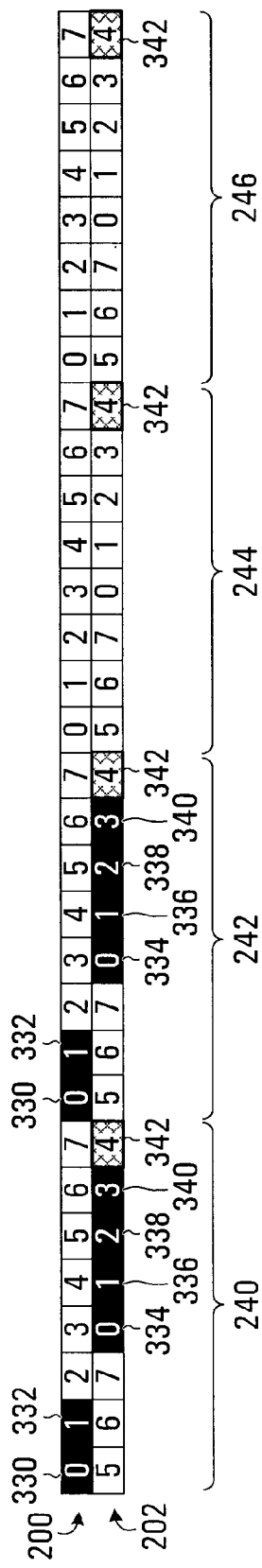

Referring now to FIG. 9, another detailed example will be presented. FIG. 9 shows a downlink RTTI TBF employing 2 downlink slots and an uplink mixed TTI TBF employing 5 uplink slots. This assignment is appropriate for classes 41 to 45 for example. The specific assignment shown includes a downlink RTTI block 330,332 on downlink slots 0 and 1 during frames 240,242. On the uplink, there is an uplink RTTI block 334,336 on uplink slots 0 and 1 during frames 240,242 and an uplink RTTI block 338,340 on uplink slots 2 and 3 during frames 240,242; there is also an uplink BTTI block 342 on slot 4 during frames 240,242,244,246.

The assignment of FIG. 9 can be moved to the right by one, two or three slots. That is to say a 2+5 (downlink+uplink) assignment is provided employing a first two consecutive downlink slots out of any five consecutive downlink slots comprising first, second, third, fourth and fifth downlink slots, and employing five uplink slots corresponding with the first, second, third, fourth and fifth downlink slots such that there is an RTTI block in the first and second downlink slots, an RTTI block in the uplink slots corresponding with the first and second downlink slots, an RTTI block in the uplink slots corresponding with the third and fourth downlink slots, and a BTTI block in the uplink slot corresponding with the fifth downlink slot.

The uplink allocation for the example of FIG. 9 can be performed using the above-described modified EDA approach. For the specific example shown, it is assumed that downlink slots 0 and 1 are defined to be the downlink slots that correspond with uplink slots 0 and 1 for the purpose of BTTI USF transmission for the RTTI block assignment. Thus, a USF in the downlink RTTI block 330,332 in slot 0, slot 1, or both slots 0 and 1 can be used to allocate the RTTI block 330,332 in slots 0 and 1 and any assigned RTTI block in higher numbered slots namely RTTI block 338,340 in slots 2 and 3 during the first two frames, the next two frames, or all four frames respectively and to allocate any uplink slot assigned in BTTI mode having a higher number than either of slots 0 and 1, namely uplink slot 4 in this example, over the next four frames.

Flexible Timeslot Assignment and Mixed TTI TBF

Flexible Timeslot Assignment (FTA) brings more flexibility to assignments, however allocations are limited by the multi-slot capabilities of the UE. With Flexible Timeslot Assignment the network may assign a number of uplink and downlink timeslots that exceeds the total number of uplink and downlink timeslots that can actually be used by the MS per TDMA frame. In this case, the network shall ensure that, in each radio block period, the total number of uplink and downlink timeslots that have been allocated to the MS does not exceed the total number of uplink and downlink timeslots that can actually be used by the MS per TDMA frame. This technique provides for some flexibility as to how to allocate the assigned resources. The mixed TTI TBF assignment has advantages when using Flexible Timeslot Assignment which extend beyond the ability to allocate the odd slot that cannot find a pair for RTTI mode of operation.

Figure 10:
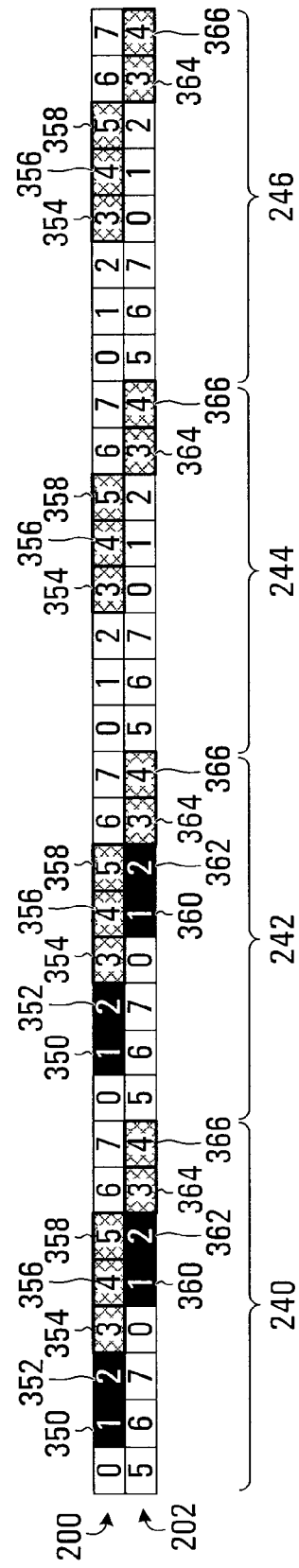

One basic radio block period (20 ms) is needed to switch between the different TTI allocations. This will be described by way of example with reference to FIG. 10. In this case it is assumed that the network has indicated a mixed TTI TBF downlink assignment in which slots 1 and 2 are assigned to carry RTTI block 350,352 in the downlink and slots 3,4 and 5 are assigned to carry BTTI blocks 354,356,358 in the downlink. The network also indicates a mixed TTI TBF uplink assignment in which slots 1 and 2 are assigned to carry RTTI blocks 360,362 in the uplink, and slots 3 and 4 are assigned to carry BTTI blocks 364 and 366 in the uplink. As with the existing Flexible Timeslot Assignment application (where only one TTI mode is assigned per TBF), the allocation can only be made according to a given UE's multi-slot capability.

Figure 11:
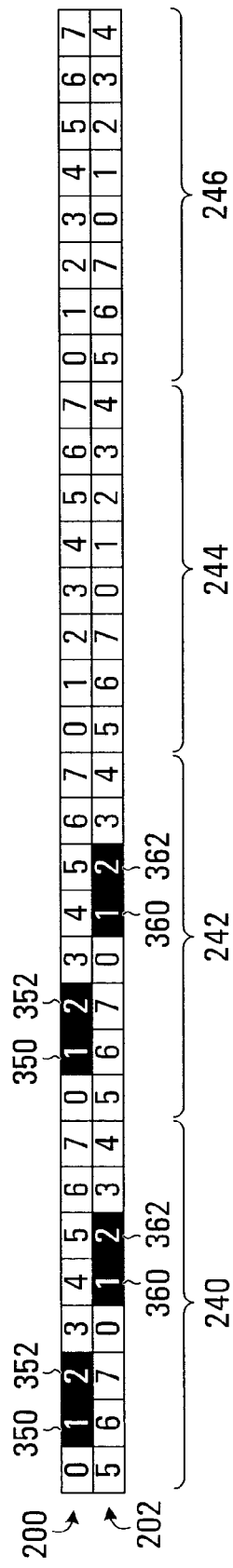
Figure 12:
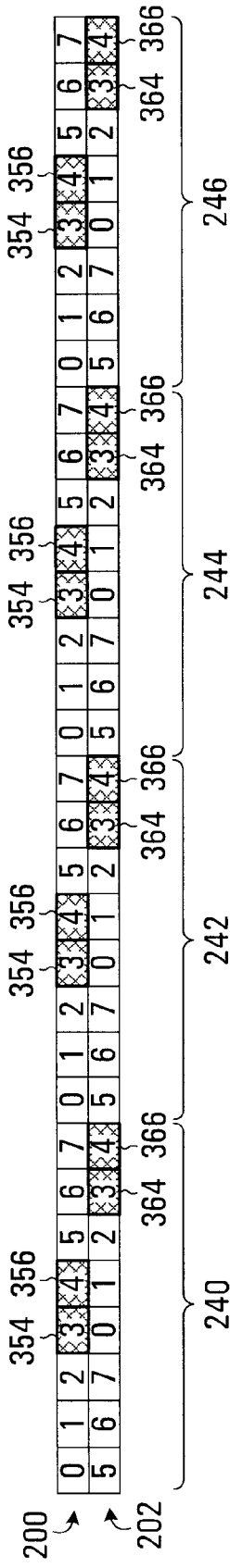

Having defined the above assignment, various different allocations can be made that are consistent with a given user equipment's multi-slot capability. FIGS. 11 and 12 are two examples of instantaneous RTTI and BTTI allocations that are consistent with the assignment shown in FIG. 10. In FIG. 11, the RTTI blocks 350,352 and 360,362 are allocated for the downlink and uplink respectively in timeslots 1 and 2. In the example of FIG. 12, BTTI blocks 354,356 and 364,366 are allocated in timeslots 3 and 4 for the downlink and the uplink respectively. Other instantaneous BTTI allocations (example 3+1) are possible for this assignment (limited by the multi-slot capability constraints).

Further Enhancements

In some embodiments, the RLC/MAC uplink/downlink assignment messages are enhanced to allocate a mixed mode TBF. In some embodiments, this indicates the slot(s) which carry the BTTI blocks in addition to the slots that form RTTI pairs. In some embodiments, these signaling messages are modified: Packet Downlink Assignment message, Packet Uplink Assignment message, and Packet Timeslot Reconfigure message.

Figure 13:
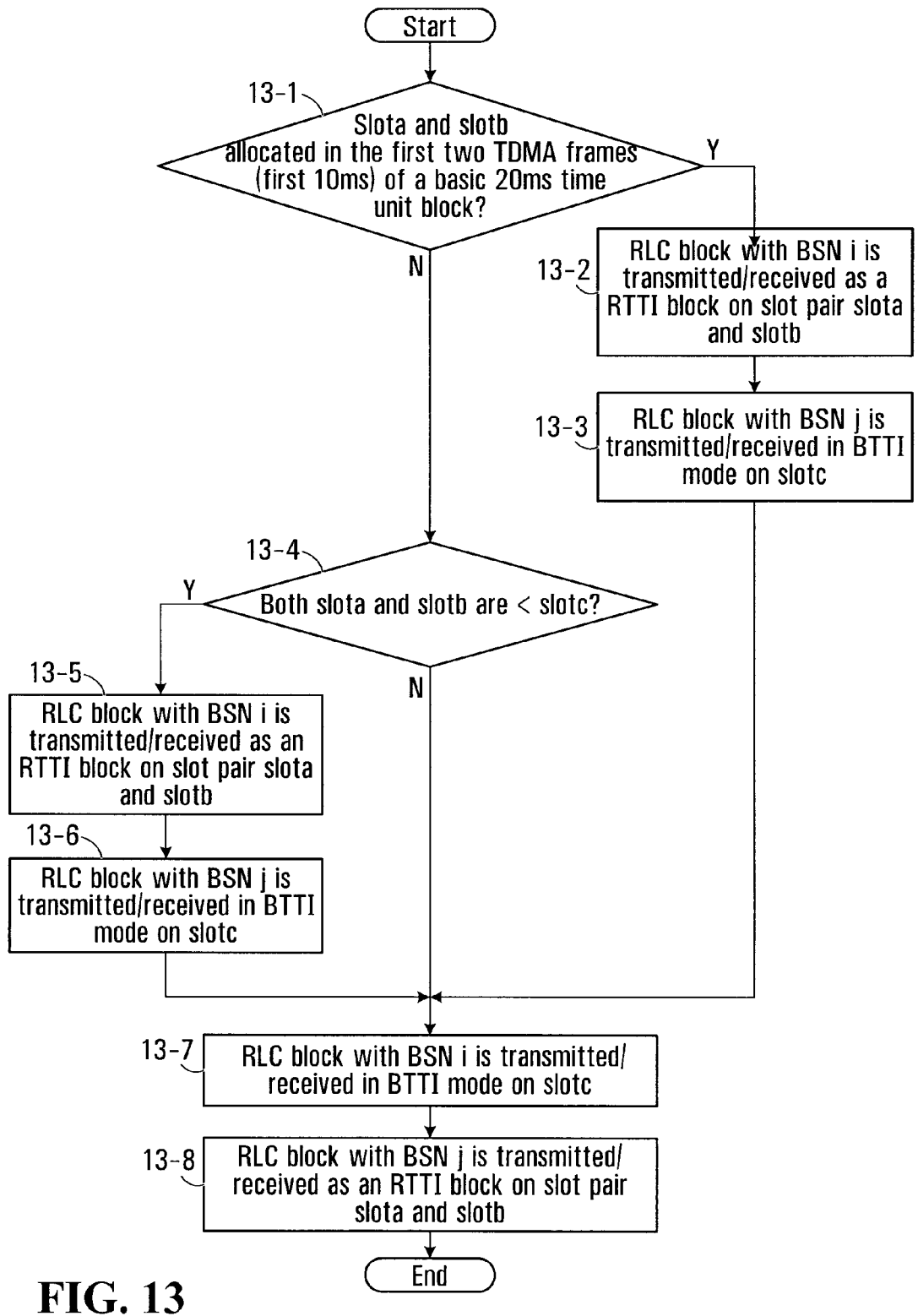
FIG. 13 is a flowchart of a method of slot assignment for MTTI TBFs.

In some embodiments, the transmission/reception of the RLC (radio link control) blocks as BTTI blocks or RTTI blocks follow the following method detailed below with reference to FIG. 13. This method can be performed by the UE in a transmission and/or reception role, and can be performed by the network in a transmission and/or reception role. This particular method ensures in order delivery of RLC blocks, especially for RLC unacknowledged mode of operation. An input to the method is the objective to transmitting/receiving two RLC blocks with BSNs i, j where i<j, using a slot-pair slota and slotb carrying an RTTI block and BTTI slot slotc assigned in a mixed TTI mode TBF.

If slota and slotb are allocated in the first two TDMA frames (first 10 ms) of a basic 20 ms time unit block (yes path block 13-1), then the RLC block with BSN i is transmitted/received as an RTTI block on slot-pair slota and slotb at block 13-2 and the RLC block with BSN j is transmitted/received in BTTI mode on slotc at block 13-3.

If slota and slotb are allocated in the last two TDMA frames (next 10 ms) of a basic 20 ms time unit block (no path, block 13-1), then the following rule applies:

If both slota and slotb are <slotc (yes path block 13-4) then the RLC block with BSN i is transmitted/received as an RTTI block on slot-pair slota and slotb at block 13-5 and the RLC block with BSN j is transmitted/received in BTTI mode on slotc at block 13-6;

Else (no path, block 13-4), the RLC block with BSN i is transmitted/received in BTTI mode on slotc at block 13-7 and the RLC block with BSN j is transmitted/received as an RTTI block on slot-pair slota and slotb at block 13-8.

In some embodiments, the mixed TTI TBF concept described above can also be applied to a (Dual downlink Carrier) DLDC configuration.

All of the detailed examples have involved the definition and use of mixed TTI TBFs that combine at least one RTTI block and at least one BTTI block. More generally, mixed-type combinations of slots are defined. A mixed TTI TBF is a specific example of a mixed-type combination of slots. More generally, a mixed-type combination of slots has slots of at least two different types. BTTI mode slots and RTTI mode slots are examples of two different types of slots, but others are envisaged. Such a mixed-type combination of slots can be assigned for the uplink or the downlink.

Communication in accordance with an allocation refers to reception or transmission as may be appropriate depending on whether the actor is the network or the UE, and depending on whether it is uplink or downlink communication.

Figure 20:
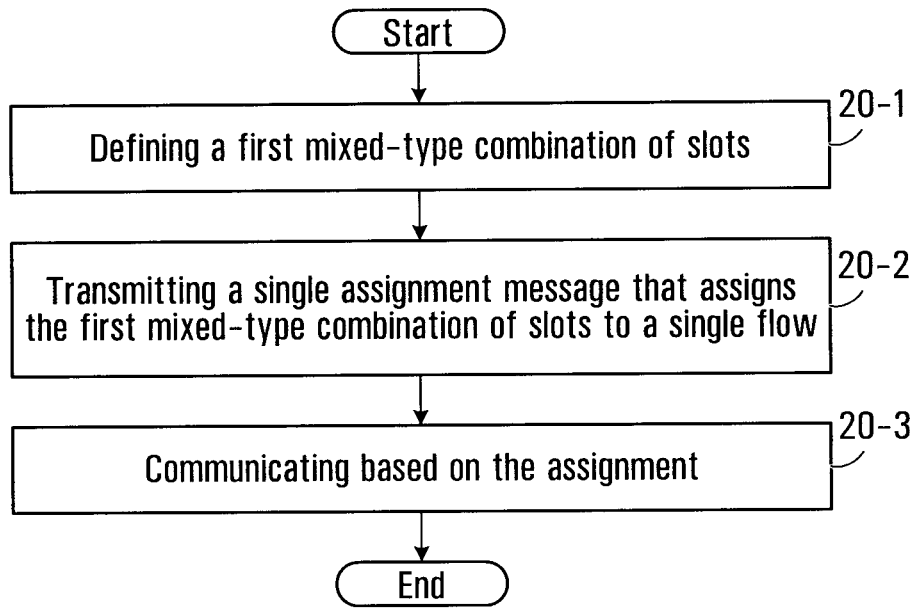
FIG. 20 is a flowchart of a method for execution by network access equipment.

Referring now to FIG. 20, shown is a flowchart of a method for execution by network access equipment. The method begins at block 20-1 with defining a first mixed-type combination of slots. The method continues at block 20-2 with transmitting a single assignment message that assigns the first mixed-type combination of slots to a single flow. Note that this does not rule out the assignment message that assigns the first mixed-type combination of slots to a single flow from assigning other slots to other flows; this does not rule out other assignment messages making other assignments. In the detailed examples, a flow is a TBF, and a given TBF is typically associated with a particular application and/or PDP context. More generally, a flow is some amount of data that typically belongs to one application and is burstwise in nature. A flow may, for example, be established to transmit the queued up data and then be released when the queue is empty.

The method may continue with the network communicating based on the assignment in block 20-3. This may involve transmitting using the assignment if it is a downlink assignment, or transmitting an uplink allocation in respect of the assignment if it is an uplink assignment, and then receiving in accordance with the allocation.

In some embodiments, block 20-1 is not executed, the mixed-type combination of slots constituting an input to the method.

Figure 21:
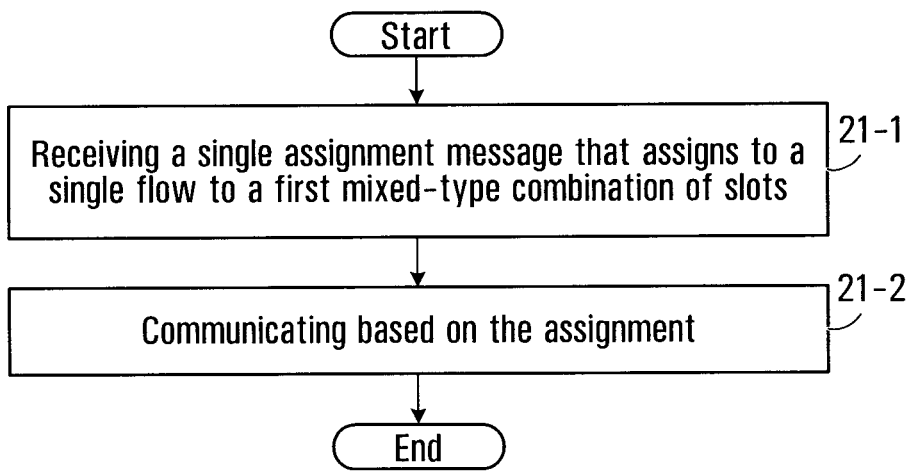
FIG. 21 is a flowchart of a method for execution by a UE.

Referring now to FIG. 21, shown is a flowchart of a method for execution by a UE. The method begins with the user equipment receiving a single assignment message that assigns to a single flow a first mixed-type combination of slots, in block 21-1. This may include an uplink assignment, a downlink assignment, or both, depending on a given implementation. The method continues with the UE communicating based on the received assignment in block 21-2. This may involve receiving using the assignment if it is a downlink assignment, or receiving an uplink allocation in respect of the assignment if it is an uplink assignment, and then transmitting in accordance with the allocation.

Figure 18:
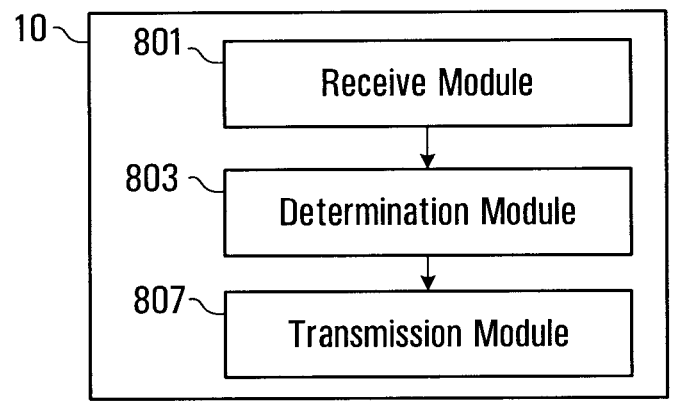
FIG. 18 is an exemplary diagram of modules in the UE.

In order to carry out the above process, the UE 10 comprises a processor capable of performing the above process. For simplicity, the different functions have been broken out into different modules. These modules may be implemented separately or together. Further, these modules may be implemented in hardware, software, or some combination. Finally, these modules may reside in different portions of the UE. As illustrated in FIG. 18, the UE processor comprises a receive module 801, a determination module 803, and a transmission module 807. The receive module 801 receives a message indicating an assignment of a mixed TTI TBF to use. It may also allocate information for uplink allocation. The determination module 803 decodes the message to determine the mixed TTI TBF. The receive module 801 and the transmission module 807 receive and/or transmit in accordance with an allocation of the mixed TTI TBF assignment.

Figure 19:
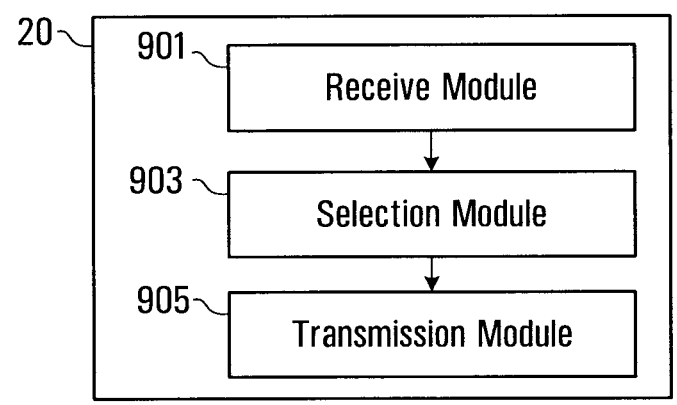
FIG. 19 is an exemplary diagram of modules in the network access equipment.

Referring now to FIG. 19, the network access equipment 20 also comprises a processor. The processor comprises a receive module 901, a selection module 903 and a transmission module 905. Again, these modules are defined for simplicity, and may be executed in software, hardware, firmware, or both. Additionally, these modules may reside in the same or different portions of the network access equipment. The selection module 903 is configured to assign a mixed TTI TBF assignment for a UE and to instruct the transmission module 905 to signal the mixed TTI TBF assignment to the UE. The receive module 901 and transmission module 905 are configured to receive and/or transmit using an allocation of the mixed TTI TBF assignment. This approach is taken for each of multiple UEs being serviced by the particular network access equipment 20.

Figure 14:
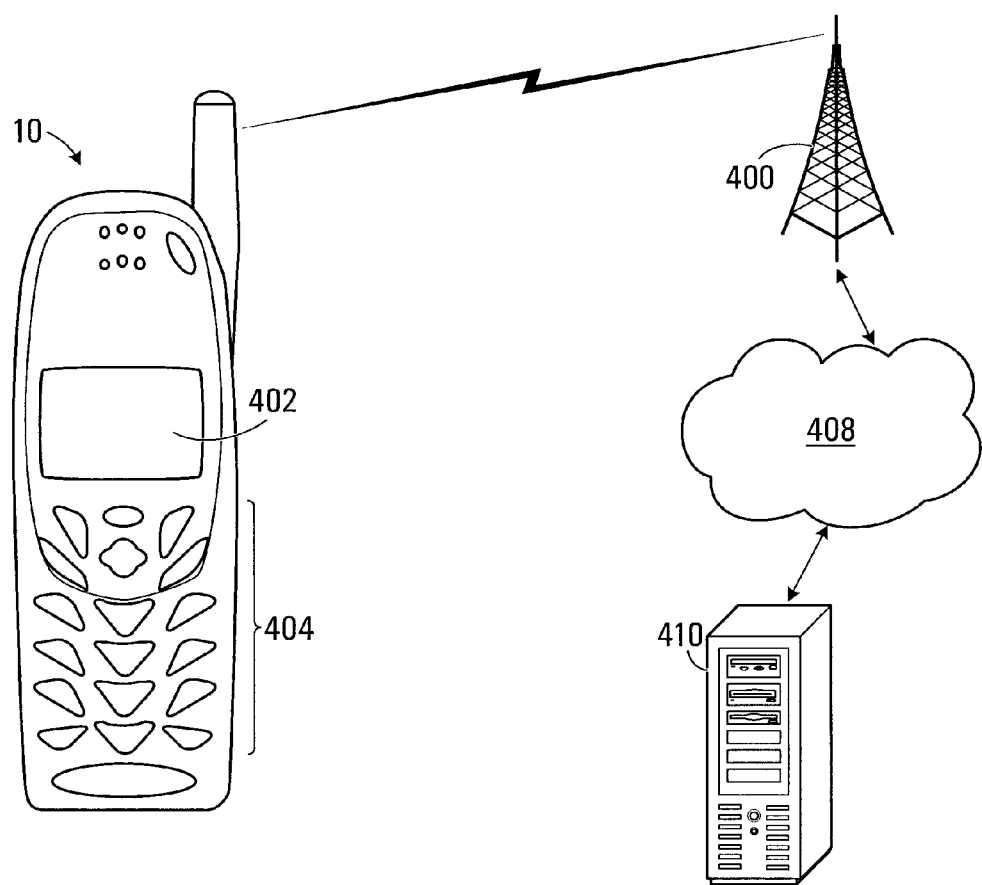
FIG. 14 is a diagram of a wireless communications system including a mobile device operable for some of the various embodiments of the disclosure.

FIG. 14 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a track wheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Figure 15:
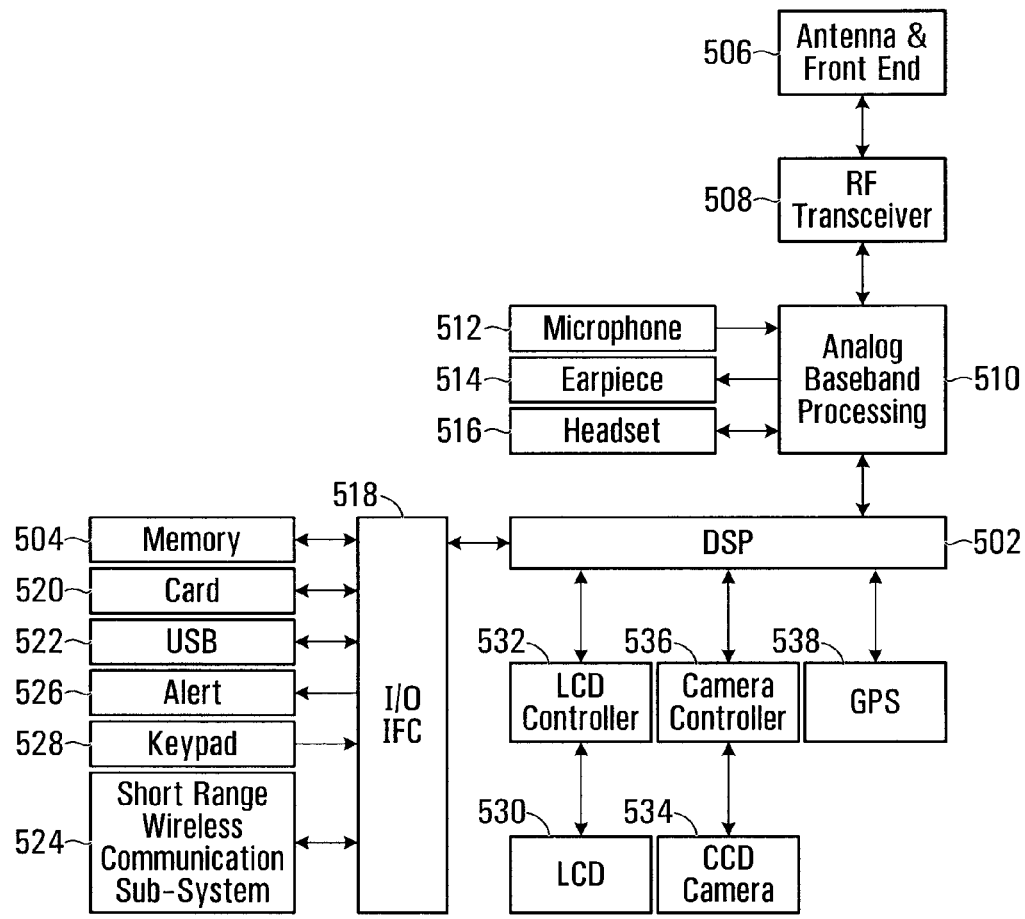
FIG. 15 is a block diagram of a mobile device operable for some of the various embodiments of the disclosure.

FIG. 15 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a track wheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 16:
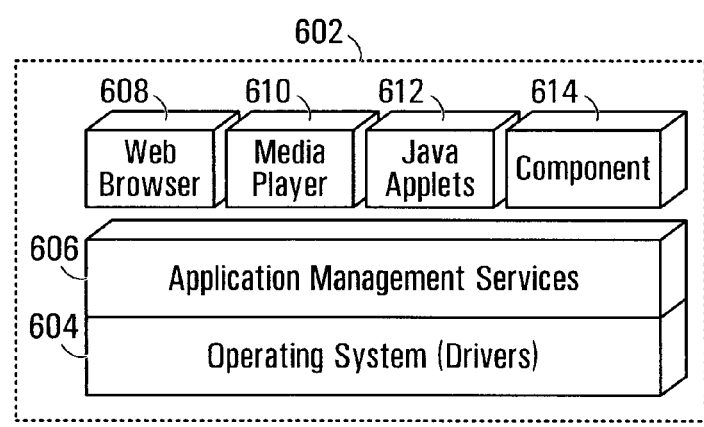
FIG. 16 is a diagram of a software environment that may be implemented on a mobile device operable for some of the various embodiments of the disclosure.

FIG. 16 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 6 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to the present disclosure.

Figure 17:
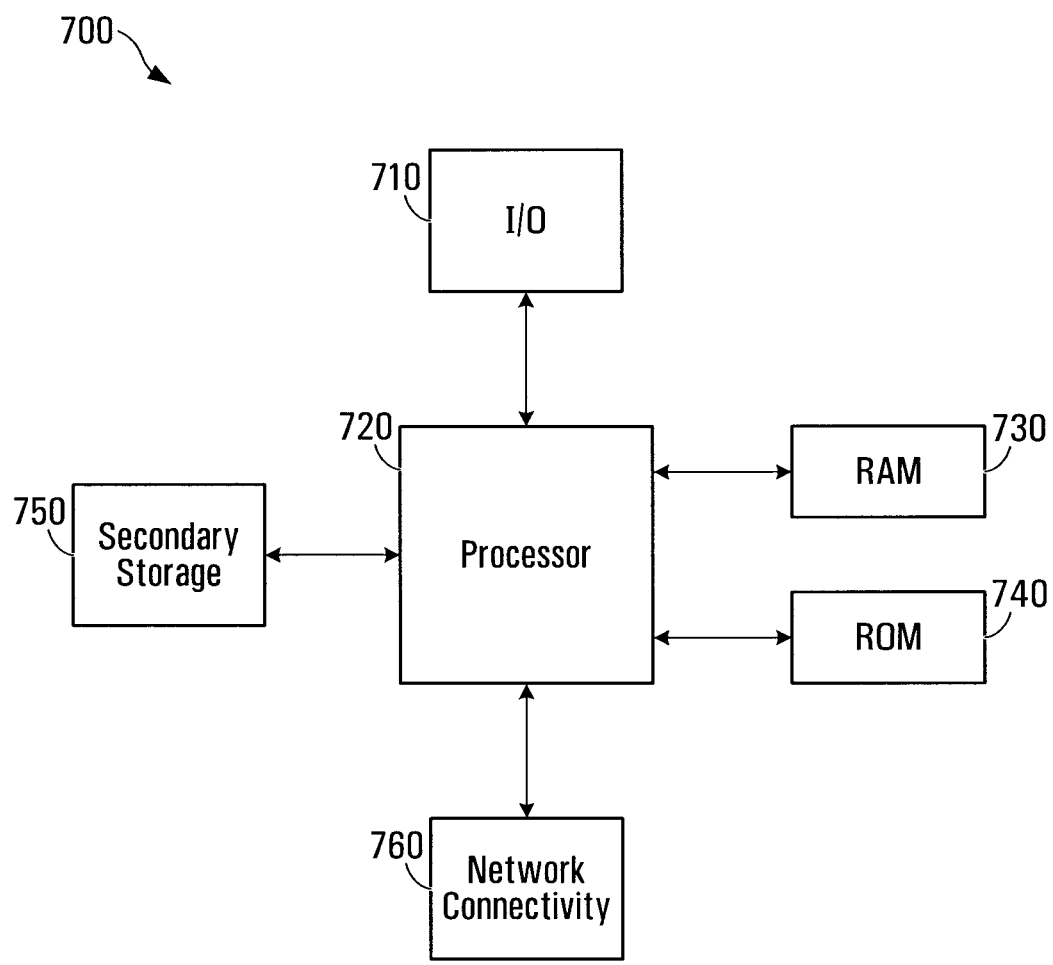
FIG. 17 is an exemplary general purpose computer according to one embodiment of the present disclosure.

The UEs 10, ENBs 20, and central control 110 of FIG. 1 and other components that might be associated with the cells 102 may include any general-purpose computer with sufficient processing power, memory resources, and network throughput capability to handle the necessary workload placed upon it. FIG. 17 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 700, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 700 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 760 may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity devices 760 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk-based systems may all be considered secondary storage 750), ROM 740, RAM 730, or the network connectivity devices 760. While only one processor 720 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Numerous modifications and variations of the present disclosure are possible in light of the above teachings. It is therefore to be understood that within the scope of the appended claims, the disclosure may be practiced otherwise than as specifically described herein.

We claim:

1. A method in a user equipment, UE, comprising:
receiving an uplink allocation for a mixed transmit time interval, TTI, combination of slots for a single temporary block flow, TBF, the mixed TTI combination of slots in the single TBF being equal to an odd number of slots greater than or equal to three and comprising a pair of slots for transmitting a reduced transmit time interval, RTTI, block and no more than one slot for transmitting a basic transmit time interval, BTTI, block.

2. The method of claim 1, wherein receiving the uplink allocation for a mixed TTI combination of slots for a single TBF comprises receiving an uplink state flag, USF.

3. The method of claim 2, wherein the USF is received on a slot corresponding to a lowest timeslot number of the pair of slots for transmitting an RTTI block.

4. The method of claim 3, wherein the slot for transmitting a BTTI block has a timeslot number that is higher than a highest timeslot number of the pair of slots for transmitting an RTTI block.

5. The method of claim 1, wherein receiving the uplink allocation for a mixed TTI combination of slots for a single TBF comprises receiving over four downlink frames an uplink state flag, USF, on a first slot of one pair of downlink slots that correspond to the pair of slots for transmitting an RTTI block to allocate uplink resources in a first two time division multiple access, TDMA, frames of a following radio block period on the pair of slots for transmitting an RTTI block and to allocate uplink resources on the slot for transmitting a BTTI block, the slot for transmitting a BTTI block having a timeslot number that is higher than a highest timeslot number of the pair of slots for transmitting an RTTI block.

6. The method of claim 1, wherein receiving the uplink allocation for a mixed TTI combination of slots for a single TBF comprises receiving over four downlink frames an uplink state flag, USF, on a first slot of one pair of downlink slots that correspond to the pair of slots for transmitting an RTTI block to allocate uplink resources in a first two time division multiple access, TDMA, frames of a following radio block period on the pair of slots for transmitting an RTTI block and on a second pair of slots for transmitting a second RTTI block having timeslot numbers higher than a highest timeslot number of the pair of slots for transmitting an RTTI block and to allocate uplink resources on the slot for transmitting a BTTI block, the slot for transmitting a BTTI block having a timeslot number that is higher than a highest timeslot number of the second pair of slots for transmitting a second RTTI block.

7. The method of claim 1, further comprising transmitting data blocks on the pair of slots for transmitting an RTTI block and the slot for transmitting a BTTI block.

8. The method of claim 1, further comprising receiving a single assignment message that assigns the single TBF.

9. The method of claim 8, wherein the assignment message contains an indication that the assignment is a mixed TTI TBF assignment, an indication of the pair of slots for transmitting an RTTI block, and an indication of the slot for transmitting a BTTI block.

10. A user equipment configured to implement a method comprising:
receiving an uplink allocation for a mixed transmit time interval, TTI, combination of slots for a single temporary block flow, TBF, the mixed TTI combination of slots in the single TBF being equal to an odd number of slots greater than or equal to three and comprising a pair of slots for transmitting a reduced transmit time interval, RTTI, block and no more than one slot for transmitting a basic transmit time interval, BTTI, block.

11. A non-transitory computer readable medium having instructions stored thereon that when executed on a user equipment, instruct the user equipment to execute a method comprising:
receiving an uplink allocation for a mixed transmit time interval, TTI, combination of slots for a single temporary block flow, TBF, the mixed TTI combination of slots in the single TBF being equal to an odd number of slots greater than or equal to three and comprising a pair of slots for transmitting a reduced transmit time interval, RTTI, block and no more than one slot for transmitting a basic transmit time interval, BTTI, block.

12. A method in a network access equipment, comprising:
transmitting an uplink allocation for a mixed transmit time interval, TTI, combination of slots for a single temporary block flow, TBF, the mixed TTI combination of slots in the single TBF being equal to an odd number of slots greater than or equal to three and comprising a pair of slots for transmitting a reduced transmit time interval, RTTI, block and no more than one slot for transmitting a basic transmit time interval, BTTI, block.

13. The method of claim 12, wherein transmitting the uplink allocation for a mixed TTI combination of slots for a single TBF comprises transmitting an uplink state flag, USF.

14. The method of claim 13, wherein the USF is transmitted on a slot corresponding to a lowest timeslot number of the pair of slots for transmitting an RTTI block.

15. The method of claim 14, wherein the slot for transmitting a BTTI block has a timeslot number that is higher than a highest timeslot number of the pair of slots for transmitting an RTTI block.

16. The method of claim 12, wherein transmitting the uplink allocation for a mixed TTI combination of slots for a single TBF comprises receiving over four downlink frames an uplink state flag, USF, on a first slot of one pair of downlink slots that correspond to the pair of slots for transmitting an RTTI block to allocate uplink resources in a first two time division multiple access, TDMA, frames of a following radio block period on the pair of slots for transmitting an RTTI block and to allocate uplink resources on the slot for transmitting a BTTI block, the slot for transmitting a BTTI block having a timeslot number that is higher than a highest timeslot number of the pair of slots for transmitting an RTTI block.

17. The method of claim 12, wherein transmitting the uplink allocation for a mixed TTI combination of slots for a single TBF comprises receiving over four downlink frames an uplink state flag, USF, on a first slot of one pair of downlink slots that correspond to the pair of slots for transmitting an RTTI block to allocate uplink resources in a first two time division multiple access, TDMA, frames of a following radio block period on the pair of slots for transmitting an RTTI block and on a second pair of slots for transmitting a second RTTI block having timeslot numbers higher than a highest timeslot number of the pair of slots for transmitting an RTTI block and to allocate uplink resources on the slot for transmitting a BTTI block, the slot for transmitting a BTTI block having a timeslot number that is higher than a highest timeslot number of the second pair of slots for transmitting a second RTTI block.

18. The method of claim 12, further comprising receiving data blocks on the pair of slots for transmitting an RTTI block and the slot for transmitting a BTTI block.

19. The method of claim 12, further comprising transmitting a single assignment message that assigns the single TBF.

20. The method of claim 19, wherein the assignment message contains an indication that the assignment is a mixed TTI TBF assignment, an indication of the pair of slots for transmitting an RTTI block, and an indication of the slot for transmitting a BTTI block.

21. A network access equipment configured to implement a method comprising:
   transmitting an uplink allocation for a mixed transmit time interval, TTI, combination of slots for a single temporary block flow, TBF, the mixed TTI combination of slots in the single TBF being equal to an odd number of slots greater than or equal to three and comprising a pair of slots for transmitting a reduced transmit time interval, RTTI, block and no more than one slot for transmitting a basic transmit time interval, BTTI, block.

22. A non-transitory computer readable medium having instructions stored thereon that when executed on a network access equipment, instruct the network access equipment to execute the steps of a method comprising:
   transmitting an uplink allocation for a mixed transmit time interval, TTI, combination of slots for a single temporary block flow, TBF, the mixed TTI combination of slots in the single TBF being equal to an odd number of slots greater than or equal to three and comprising a pair of slots for transmitting a reduced transmit time interval, RTTI, block and no more than one slot for transmitting a basic transmit time interval, BTTI, block.

* * * * *